(12) United States Patent
Tashiro

(10) Patent No.: US 8,947,357 B2
(45) Date of Patent: Feb. 3, 2015

(54) POSITION DETECTING DEVICE, INFORMATION PROCESSING DEVICE, POSITION DETECTION METHOD, INFORMATION PROCESSING METHOD, AND COMPUTER READABLE MEDIUM

(75) Inventor: Kiyoshi Tashiro, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 386 days.

(21) Appl. No.: 13/397,407

(22) Filed: Feb. 15, 2012

(65) Prior Publication Data

US 2013/0069872 A1    Mar. 21, 2013

(30) Foreign Application Priority Data

Sep. 21, 2011    (JP) .................................. 2011-205576

(51) Int. Cl.
*G06F 3/033*    (2013.01)
*G06F 15/00*    (2006.01)

(52) U.S. Cl.
CPC ................ *G06F 3/033* (2013.01); *G06F 15/00* (2013.01)
USPC ........................................................ 345/158

(58) Field of Classification Search
USPC .................... 345/1.3, 3.1, 157; 709/203, 208; 702/141
See application file for complete search history.

(56) References Cited

FOREIGN PATENT DOCUMENTS

| JP | 09-081485 A | 3/1997 |
| JP | 11-134087 A | 5/1999 |
| JP | 11-143606 A | 5/1999 |
| JP | 2005-266226 A | 9/2005 |
| JP | 2011-101118 A | 5/2011 |

*Primary Examiner* — Abbas Abdulselam
(74) *Attorney, Agent, or Firm* — Sughrue Mion, PLLC (57) ABSTRACT

A position detecting device includes a device specifying unit, a motion obtaining unit, and a relative position detecting unit. The device specifying unit specifies plural information processing devices that have been brought into contact with one another. The motion obtaining unit obtains information about a motion of any one of the plural information processing devices. The relative position detecting unit detects, on the basis of a motion produced when the any one of the plural information processing devices specified by the device specifying unit is brought into contact with another of the plural information processing devices, relative positions of the plural information processing devices specified by the device specifying unit.

14 Claims, 10 Drawing Sheets

POSITION DETECTING DEVICE, INFORMATION PROCESSING DEVICE, POSITION DETECTION METHOD, INFORMATION PROCESSING METHOD, AND COMPUTER READABLE MEDIUM

CROSS-REFERENCE TO RELATED APPLICATIONS

This application is based on and claims priority under 35 USC 119 from Japanese Patent Application No. 2011-205576 filed Sep. 21, 2011.

BACKGROUND

(i) Technical Field

The present invention relates to a position detecting device, an information processing device, a position detection method, an information processing method, and a computer readable medium.

SUMMARY

According to an aspect of the invention, there is provided a position detecting device including a device specifying unit, a motion obtaining unit, and a relative position detecting unit. The device specifying unit specifies plural information processing devices that have been brought into contact with one another. The motion obtaining unit obtains information about a motion of any one of the plural information processing devices. The relative position detecting unit detects, on the basis of a motion produced when the any one of the plural information processing devices specified by the device specifying unit is brought into contact with another of the plural information processing devices, relative positions of the plural information processing devices specified by the device specifying unit.

BRIEF DESCRIPTION OF THE DRAWINGS

Exemplary embodiment(s) of the present invention will be described in detail based on the following figures, wherein.

DETAILED DESCRIPTION

Figure 1:
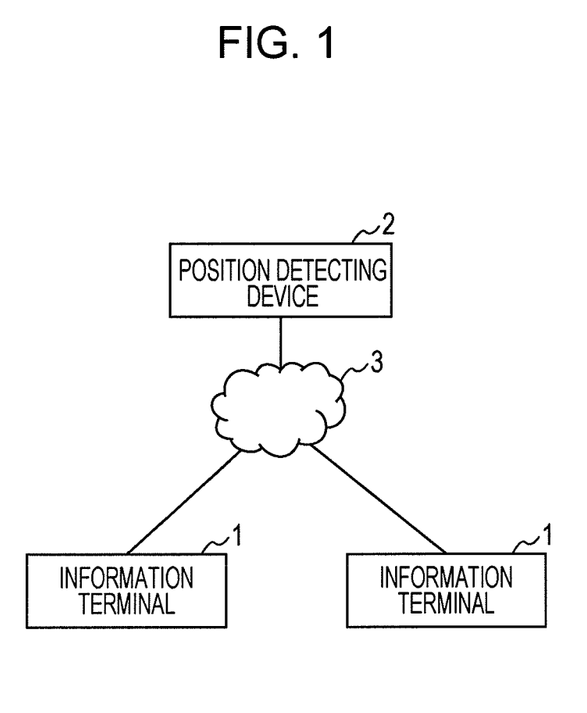
FIG. 1 is a diagram illustrating an example of the configuration of a position detecting system according an exemplary embodiment of the present invention.

Hereinafter, an exemplary embodiment of the present invention will be described in detail with reference to the drawings. FIG. 1 is a diagram illustrating an example of the configuration of a position detecting system according to the exemplary embodiment. As illustrated in FIG. 1, the position detecting system includes plural information terminals 1 and a position detecting device 2. The plural information terminals 1 and the position detecting device 2 communicate with each other via a network 3.

Figure 2:
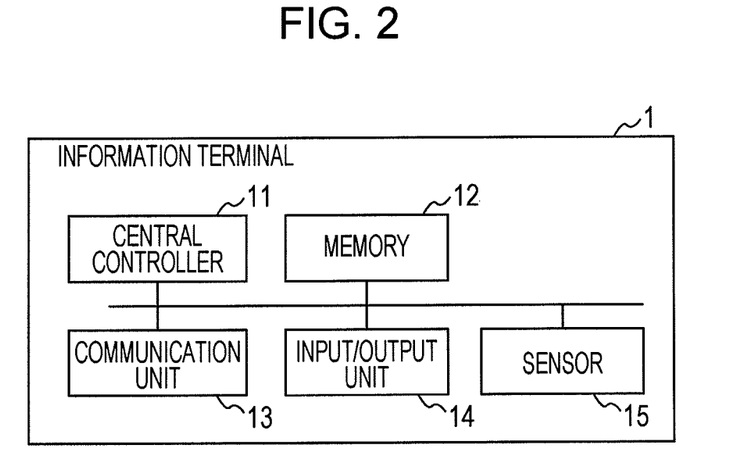
FIG. 2 is a diagram illustrating an example of the configuration of an information terminal.

FIG. 2 is a diagram illustrating an example of the configuration of each information terminal 1. The information terminal 1 includes a central controller 11, a memory 12, a communication unit 13, an input/output unit 14, and a sensor 15. The information terminal 1 is a kind of information processing device, for example, a tablet terminal, a smart phone, or a personal computer.

The central controller 11 operates in accordance with a program stored in the memory 12. The program may be provided via the network 3, such as the Internet, or may be provided by being stored in an information recording medium, such as a flash memory or a compact disc-read only memory (CD-ROM).

The memory 12 is constituted by memory elements, such as a random access memory (RAM) and a read only memory (ROM), and a hard disk drive or the like. The memory 12 stores the foregoing program. Also, the memory 12 stores information and operation results input from individual units.

The communication unit 13 is constituted by a communication unit for connecting to and communicating with another device. The communication unit 13 inputs information received from another device to the central controller 11 or the memory 12 and transmits information to another device on the basis of the control performed by the central controller 11.

The input/output unit 14 is constituted by a unit that controls a display output unit, such as a liquid crystal panel, and an input unit, such as a touch panel and a mouse. The input/output unit 14 outputs image data or the like to a display unit, such as a liquid crystal monitor, and obtains information from an operator through the touch panel or the like on the basis of the control performed by the central controller 11.

The sensor 15 is constituted by any one of an acceleration sensor, a gyroscope, a camera, and the like. The sensor 15 detects a motion of the information terminal 1, and detects a motion of the information terminal 1 when the information terminal 1 is brought into contact with (caused to gently collide with) another information terminal 1. Hereinafter, description will be given of a case where an acceleration sensor is used as the sensor 15.

Figure 3:
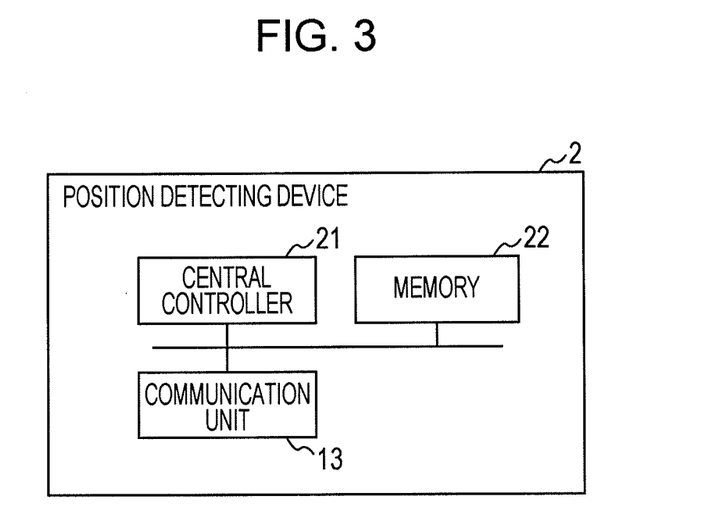
FIG. 3 is a diagram illustrating an example of the configuration of a position detecting device.

FIG. 3 is a diagram illustrating an example of the configuration of the position detecting device 2. The position detecting device 2 includes a central controller 21, a memory 22, and a communication unit 23. The position detecting device 2 is constituted by a server computer, for example.

The central controller 21 operates in accordance with a program stored in the memory 22. The program may be provided via the network 3, such as the Internet, or may be provided by being stored in an information recording medium, such as a CD-ROM or a digital versatile disc-read only memory (DVD-ROM).

The memory 22 is constituted by memory elements, such as a RAM and a ROM, and a hard disk drive or the like. The memory 22 stores the foregoing program. Also, the memory 22 stores information and operation results input from individual units.

The communication unit 23 is constituted by a communication unit for connecting to and communicating with another device. The communication unit 23 inputs information received from another device to the central controller 21 or the memory 22 and transmits information to another device on the basis of the control performed by the central controller 21.

Hereinafter, the functions of the information terminals 1 and the position detecting device 2 will be described, together with the processes performed by the information terminals 1 and the position detecting device 2.

Figure 4:
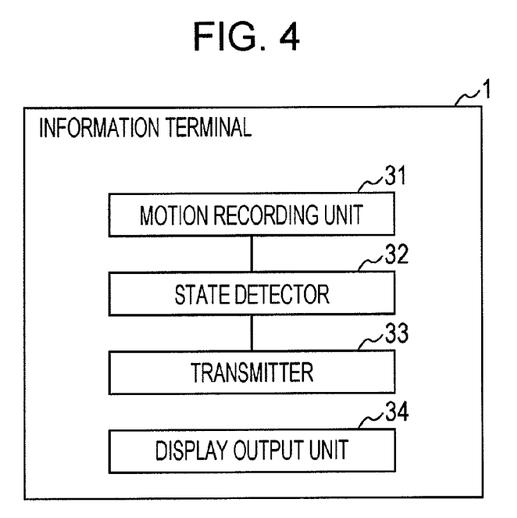
FIG. 4 is a functional block diagram illustrating functions realized by the information terminal.
Figure 5:
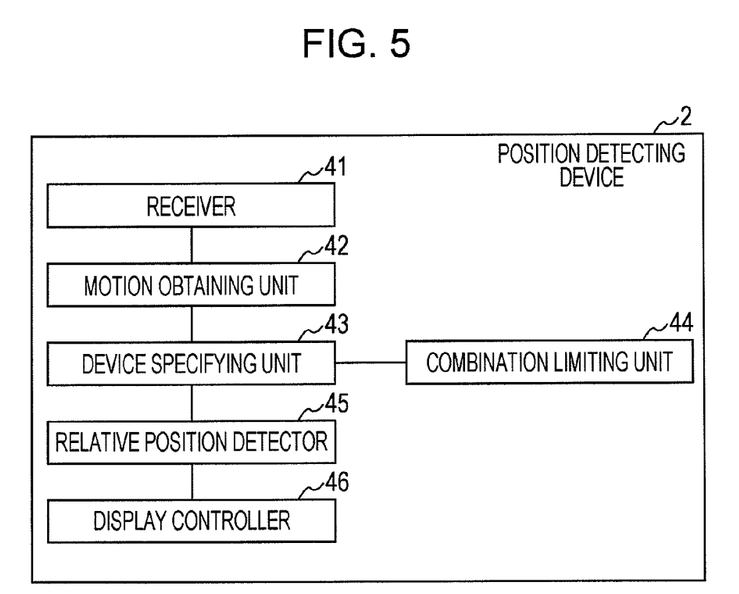
FIG. 5 is a functional block diagram illustrating functions realized by the position detecting device.

FIG. 4 is a functional block diagram illustrating the functions realized by the information terminal 1. The information terminal 1 functionally includes a motion recording unit 31, a state detector 32, a transmitter 33, and a display output unit 34. These functions are realized when the central controller 11 executes the program stored in the memory 12 so as to control the communication unit 13, the input/output unit 14, and the sensor 15. The display output unit 34 is mainly realized by the central controller 11 and the input/output unit 14, and displays an image on a display on the basis of the control performed by a display controller 46 included in the position detecting device 2. FIG. 5 is a functional block diagram illustrating the functions realized by the position detecting device 2. The position detecting device 2 functionally includes a receiver 41, a motion obtaining unit 42, a device specifying unit 43, a combination limiting unit 44, a relative position detector 45, and the display controller 46. These functions are realized when the central controller 21 executes the program stored in the memory 22 so as to control the communication unit 23.

Figure 6:
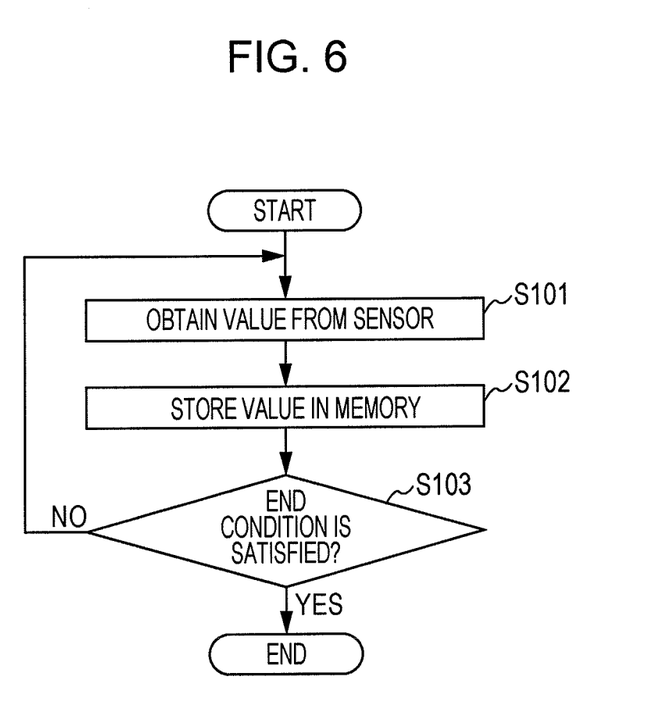
FIG. 6 is a flowchart illustrating an example of a process performed by a motion recording unit.

The motion recording unit 31 is mainly realized by the central controller 11, the memory 12, and the sensor 15. The motion recording unit 31 stores an output of the sensor 15, which detects a motion, in the memory 12. FIG. 6 is a flowchart illustrating an example of a process performed by the motion recording unit 31. In step S101, the motion recording unit 31 obtains a value from the sensor 15 at certain time intervals. In step S102, the motion recording unit 31 stores, in the memory 12, the value obtained from the sensor 15. The motion recording unit 31 stores, in the memory 12, the value obtained from the sensor 15 this time so that the information obtained in a certain past period is held, in other words, so that the values obtained from the sensor 15 the last N times are held. When an end condition is satisfied, for example, when an end instruction from an operator is input or when timeout occurs (YES in step S103), the process of the motion recording unit 31 ends. When the end condition is not satisfied (NO in step S103), the process is repeated from step S101.

Figure 7:
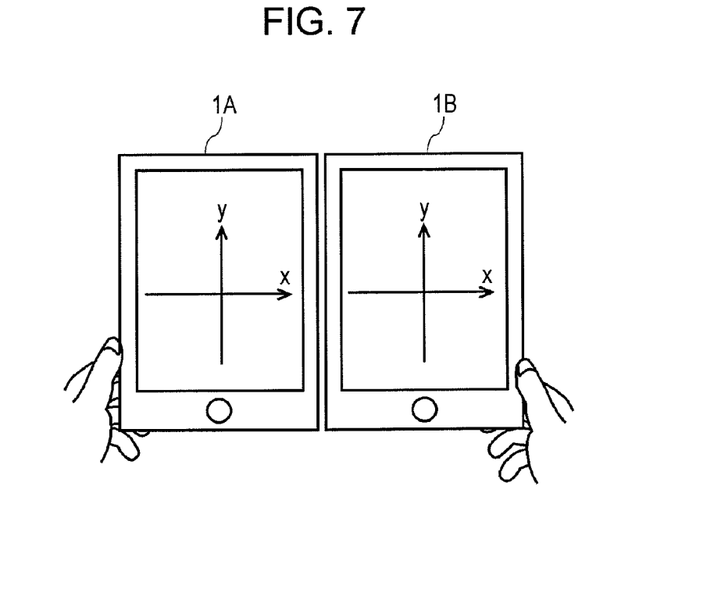
FIG. 7 is a diagram illustrating an example of two information terminals that are brought into contact with each other.

FIG. 7 is a diagram illustrating an example of two information terminals 1A and 1B that are brought into contact with each other. FIG. 7 illustrates a state where an operator holds the information terminals 1A and 1B next to each other, one on the right and the other on the left, so as to view information displayed thereon. The information terminal 1B is placed on the right of the information terminal 1A (in the positive direction of an x axis). Each of the information terminals 1A and 1B illustrated in FIG. 7 includes an acceleration sensor serving as the sensor 15. The axes along which the acceleration sensor detects acceleration are illustrated on the display of each of the information terminals 1A and 1B. Although not illustrated, the acceleration sensor also detects acceleration along a z axis, that is, in the depth direction. Hereinafter, description will be given of an example in which the operator performs three times an operation of bringing adjacent side surfaces among side surfaces of the information terminals 1A and 1B, for which the positional relationship is to be specified, into contact with each other, and causes the position detecting device 2 to detect the positional relationship on the basis of the operations. In each of the information terminals 1 for which the positional relationship has been specified, an image is displayed in accordance with the positional relationship. This will be described below.

Figure 8:
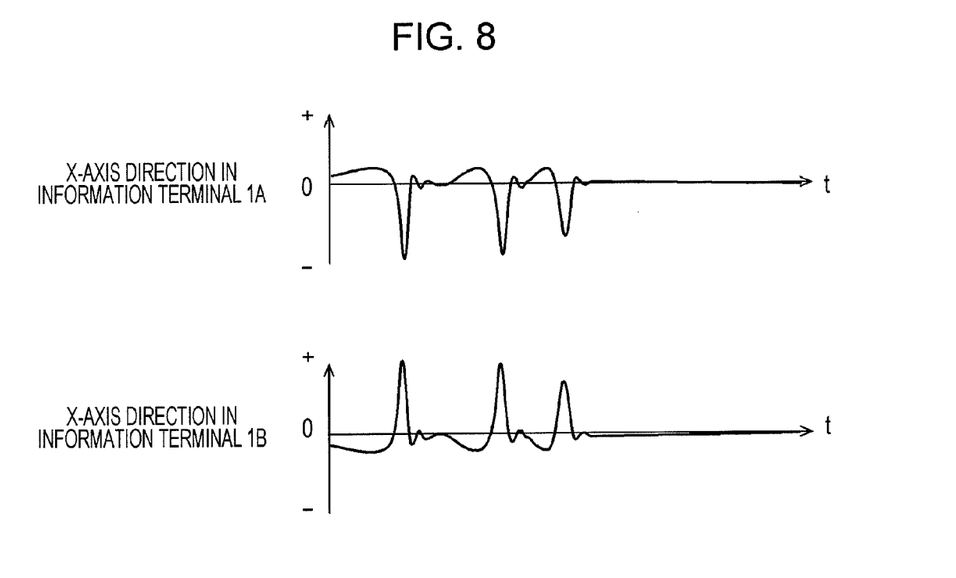
FIG. 8 is a diagram illustrating an example of output waveforms of sensors in the contact operation illustrated in FIG. 7.

FIG. 8 is a diagram illustrating an example of output waveforms of the sensors 15 in the contact operation illustrated in FIG. 7. In FIG. 7, the information terminals 1A and 1B are moved in the x-axis direction so as to come into contact with each other. The acceleration detected in the contact operation is acceleration in the x-axis direction, and the directions of the accelerations of the information terminals 1A and 1B at the moment when they are brought into contact with each other are almost opposite due to the action-reaction law. On the basis of the output waveforms of the sensors 15, the position detecting device 2 specifies the information terminals 1 that have been brought into contact with each other, and detects the positional relationship thereof. The details of the process will be described below.

Figure 9:
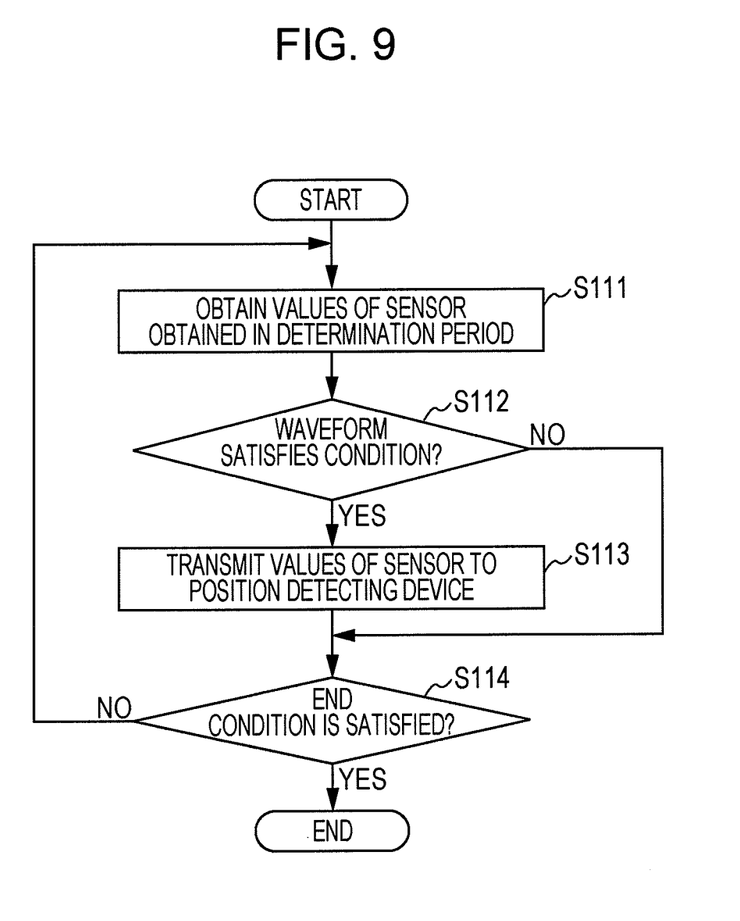
FIG. 9 is a flowchart illustrating an example of a process performed by a state detector and a transmitter.

FIG. 9 is a flowchart illustrating an example of a process performed by the state detector 32 and the transmitter 33. The state detector 32 is mainly realized by the central controller 11 and the memory 12. The transmitter 33 is mainly realized by the central controller 11 and the communication unit 13. The state detector 32 detects the state of having been brought into contact with another information terminal 1 on the basis of the output of the sensor 15, which detects a motion. When the contact state is detected, the transmitter 33 transmits information representing the motion of being brought into contact to the position detecting device 2, which detects a relative position with respect to another information terminal 1. More specifically, in step S111, the state detector 32 obtains, from the information stored in the memory 12 by the motion recording unit 31, a sequence of values of the sensor 15 obtained in the first M times (hereinafter referred to as a determination period). M is a natural number equal to or less than N. In step S112, the state detector 32 determines whether the waveform representing the sequence of the obtained values of the sensor 15 satisfies a condition for a trigger of the process of detecting a positional relationship. In the example illustrated in FIG. 8, the condition for a trigger is whether or not the information terminal 1 has been brought into contact with another object (here, another information terminal 1) three consecutive times. More specifically, the state detector 32 detects fluctuations of acceleration caused by three contact operations, in other words, detects that a series of first to third periods has been repeated three times. The first period has acceleration of a relatively small absolute value for a few tenth of a second. The second period, which follows the first period, momentarily has acceleration in the opposite direction at an absolute value larger than in the first period. The third period, which follows the second period, has vibration in which the absolute value gradually decreases. The first period corresponds to a movement operation performed by an operator. The second period corresponds to the moment when the information terminals 1 are brought into contact with each other. The vibration in the third period is caused, after the contact operation, by the elasticity of the information terminals 1 and the elasticity of fingers of the operator who is holding the information terminals 1. In the above-described condition, the information terminals 1 are brought into contact with each other three times, but the number of contact operations is not limited to three. If the number of contact operations is specified to two or more, wrong specification of an information terminal 1 that is not brought into contact is suppressed.

If the condition for a trigger is satisfied (YES in step S112), the transmitter 33 transmits the sequence of the values of the sensor 15 in the determination period to the position detecting device 2 in step S113. The transmitter 33 also transmits a detection time of the sequence. If the above-described condition is not satisfied (NO in step S112), or after step S113, the state detector 32 determines in step S114 whether an end condition is satisfied, for example, whether an end instruction from the operator has been input. If the end condition is satisfied (YES in step S114), the process ends. If the end condition is not satisfied (NO in step S114), the process is repeated from step S111.

The sequence of the values of the sensor 15 transmitted by the transmitter 33 may be, for example, a sequence of the values of the x axis, y axis, and z axis of the acceleration sensor, or may be information about an angle of the axis indicating the direction of a contact operation detected using a known method, and a sequence of values of acceleration obtained through coordinate transformation in the direction of the axis. The latter sequence of values is used in a case where the position detecting device 2 detects that a contact operation is performed in a direction other than the x-axis direction, y-axis direction, and z-axis direction.

Figure 10:
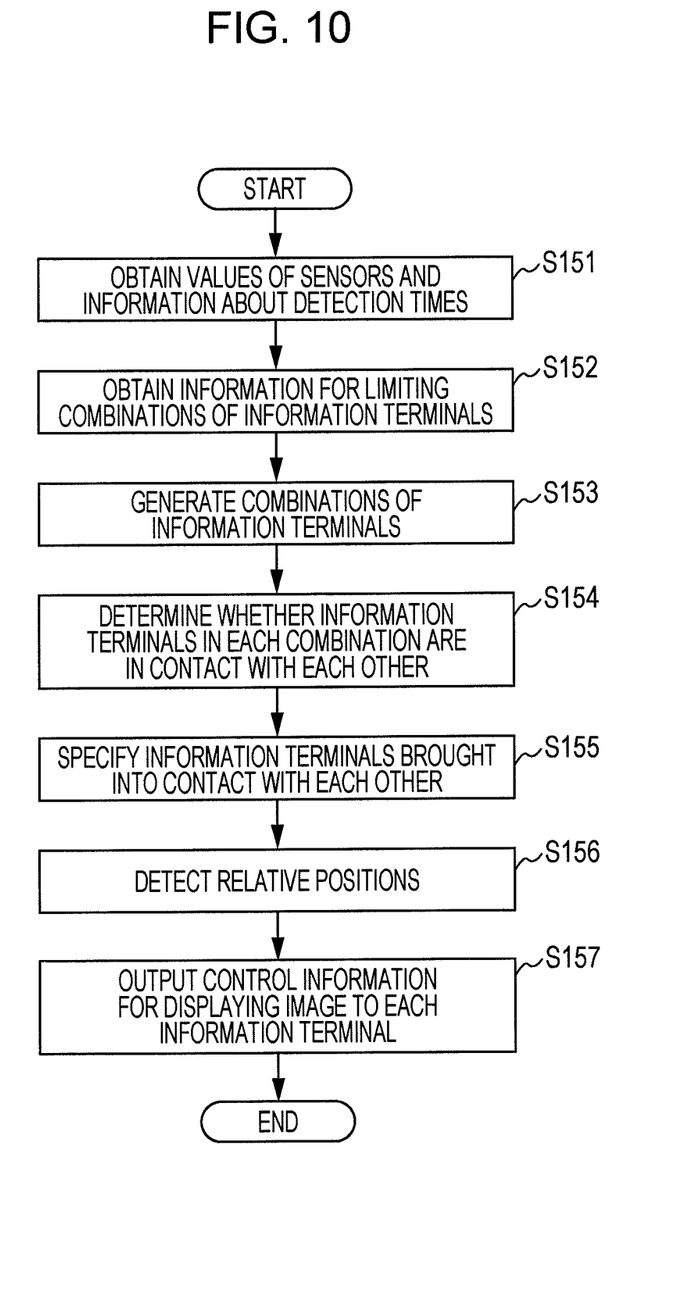
FIG. 10 is a flowchart illustrating an example of a process performed by a position detecting device.

FIG. 10 is a flowchart illustrating an example of a process performed by the position detecting device 2. Hereinafter, description will be given of the functions realized by the position detecting device 2 in accordance with the flowchart. The receiver 41 is mainly realized by the central controller 21 and the communication unit 23. The receiver 41 receives, from the information terminal 1, a sequence of values of the sensor 15 in a determination period, and information including a detection time when the values of the sensor 15 were detected, and stores the received information in the memory 22 in association with the information terminal 1 that has transmitted the information.

The motion obtaining unit 42 is mainly realized by the central controller 21 and the memory 22. The motion obtaining unit 42 obtains information about motions of plural information terminals 1. More specifically, in step S151, the motion obtaining unit 42 obtains, from the memory 22, sequences of values of the sensors 15 in the determination period transmitted from the individual information terminals 1, and information about detection times when the detections were performed. Here, the motion obtaining unit 42 obtains sequences of values of the sensors 15 output in a certain range (for example, for five seconds) from the time when the process is performed. The time for determining the certain range may be the foregoing detection time that has been corrected in accordance with a difference between clocks of each information terminal 1 and the position detecting device 2. In a case where the device specifying unit 43 (described below) specifies plural information terminals 1 that have been brought into contact with each other by using information other than the values of the sensors 15, the motion obtaining unit 42 may obtain the motion of any one of the plural information terminals 1.

The combination limiting unit 44 is mainly realized by the central controller 21 and the memory 22. The combination limiting unit 44 limits combinations of plural information terminals 1 specified by the device specifying unit 43. Specifically, in step S152, the combination limiting unit 44 obtains information that limits combinations of information terminals 1 and that is stored in advance in the memory 22. The information that limits combinations may be information about a combination that is prohibited to be specified by the device specifying unit 43 among combinations of information terminals 1, or may be information about a combination that is allowed to be specified by the device specifying unit 43. A combination of information terminals 1 may be specified using identification information of the information terminals 1, or may be specified using information about the owners of the information terminals 1 or information about a group to which the owners belong. In a case where combinations are limited, the number of combinations to be processed reduces and the processing time is shortened when the device specifying unit 43 specifies plural information terminals 1. Also, limitation of combinations prevents communication between information terminals 1 that should not share information from the viewpoint of security.

The device specifying unit 43 is mainly realized by the central controller 21 and the memory 22. The device specifying unit 43 specifies plural information terminals 1 that have been brought into contact with each other. In step S153, the device specifying unit 43 generates plural combinations of two information terminals 1 among the information terminals 1 for which a sequence of values of the sensor 15 has been obtained by the motion obtaining unit 42. At that time, the device specifying unit 43 generates the plural combinations on the basis of information that limits combinations of information terminals 1, so that the combination indicated by the information is excluded. The generated combinations are targets to be determined in the subsequent step. In step S154, the device specifying unit 43 determines whether the information terminals 1 included in each of the generated combinations are in contact with each other.

Whether or not an operation of bringing into contact has been performed between the two information terminals 1 included in each combination is determined by, for example, determining whether or not the time intervals of three contacts match between the information terminals 1. Alternatively, the determination may be performed by using the consistency of impulse that may be calculated using a change in acceleration at the time of being brought into contact and the mass of the information terminals 1, complementarity of directions in which the information terminals 1 are brought into contact with each other (left direction and right direction, upward direction and downward direction, etc.), or a correlation coefficient of waveforms representing sequences of values of the sensors 15. Determining whether or not the time intervals of three contacts match is equivalent to determining whether or not the times of three contacts match. This is because the times of contacts are calculated by using a detection time, which is a condition for obtaining a sequence of values of the sensor 15 of the information terminal, and time intervals.

In step S155, the device specifying unit 43 specifies the plural information terminals 1 that have been brought into contact with each other on the basis of a combination determined to include the information terminals 1 that have been brought into contact with each other. In a case where two information terminals 1 have been brought into contact with each other, the number of detected combinations is one, and thus the two information terminals 1 included in the combination are specified as information terminals 1 that have been brought into contact with each other. In a case where three information terminals 1 have been brought into contact with one another, for example, two or three combinations are detected. In such a case, the three information terminals 1 included in these combinations are specified as information terminals 1 that have been brought into contact with one another.

Figure 11:
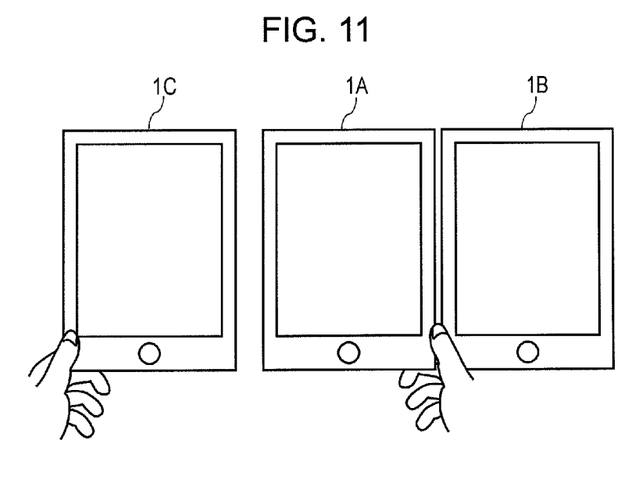
FIG. 11 is a diagram illustrating an example of three information terminals that are brought into contact with one another.
Figure 12:
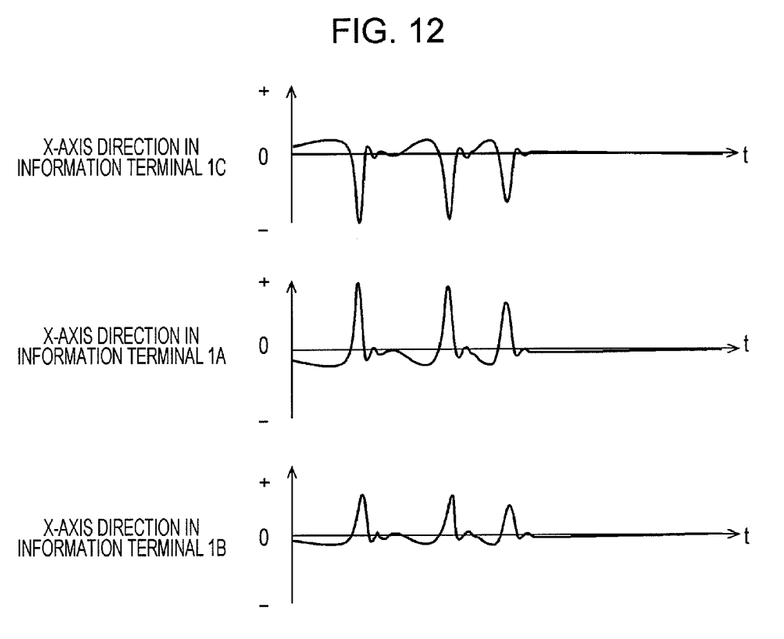
FIG. 12 is a diagram illustrating an example of output waveforms of acceleration sensors in the contact operation illustrated in FIG. 11.

FIG. 11 is a diagram illustrating an example of three information terminals 1A, 1B, and 1C that are to be brought into contact with one another. FIG. 11 illustrates a case where an operator holds the two information terminals 1A and 1B with one hand, holds the information terminal 1C with the other hand, and brings the information terminal 1C into contact with the left side of the information terminal 1A, so that the information terminal 1C is associated as being on the left of the information terminal 1A. Here, it is assumed that the information terminals 1A and 1B are in contact with each other, or are placed with a small gap therebetween, or are held with the same hand, so that fluctuations of acceleration of the information terminal 1A are transmitted to the information terminal 1B directly or indirectly. FIG. 12 is a diagram illustrating an example of output waveforms of acceleration sensors obtained in the contact operation illustrated in FIG. 11. In this case, fluctuations of acceleration caused by the information terminals 1C and 1A coming into contact with each other are transmitted to the information terminal 1B. Thus, the three information terminals 1 are specified as information terminals 1 that have been brought into contact with one another.

In this example, information terminals 1 that have been brought into contact with each other are detected on the basis of outputs of the acceleration sensors. Alternatively, another method may be used. An amount of movement may be detected using an output of a camera so as to detect timing of contact, which may be used instead of acceleration, or an output of a gyroscope may be used instead of an output of an acceleration sensor. When a personal computer serves as the information terminal 1, an amount of movement of a mouse, which is a part of the personal computer, may be used. In the case of using a mouse, an operator may cause the mouse to come into contact with a tablet terminal, which is another information terminal 1. Alternatively, a sound generated at the time of contact may be obtained using a microphone, and the information terminals 1 that have been brought into contact with each other may be specified on the basis of the timing when the sound was obtained.

The relative position detector 45 is mainly realized by the central controller 21 and the memory 22. In step S156, the relative position detector 45 detects the relative positions of plural specified information terminals 1 on the basis of a motion at the time when any of the plural specified information terminals 1 was brought into contact. The relative positions of two information terminals 1 may be detected in the following manner, for example. First, the relative position detector 45 selects an axis having the largest absolute value of the change in acceleration caused by three contact operations, in the change in acceleration along the x axis, y axis, and z axis of the individual information terminals 1. Subsequently, the relative position detector 45 obtains the direction of acceleration in the contact operations by using a sequence of values of acceleration along the selected axis. Then, the relative position detector 45 detects the relative positions of the information terminals 1 on the basis of the direction of the acceleration. For example, in the example illustrated in FIGS. 7 and 8, the relative position detector 45 detects that acceleration is generated in the negative direction of the x axis in the information terminal 1A in a contact operation, and detects that the information terminal 1B is on the positive side of the x axis (on the right) of the information terminal 1A. Also, the relative position detector 45 detects that acceleration is generated in the positive direction of the x axis in the information terminal 1B in a contact operation, and detects that the information terminal 1A is on the negative side of the x axis (on the left) of the information terminal 1B. Here, the relative position of one of the two information terminals 1 may be detected on the basis of the motion of the other information terminal 1. For example, if it is specified in advance, through the measurement of acceleration of gravity, that the orientations of the information terminals 1 are the same, it is detected that the information terminal 1A is on the left and the information terminal 1B is on the right on the basis of a sequence of values of acceleration of the information terminal 1A.

With the use of the above-described process, the positional relationship of two information terminals 1 is detected by bringing, by an operator, the two information terminals 1 into contact with each other so as to indicate the positional relationship thereof. When the operator wants to make an upper-lower positional relationship of the two information terminals 1, the operator may perform an operation of bringing the upper side surface of one of the two information terminals 1 into contact with the lower side surface of the other information terminal 1. When the operator wants to make a front-back positional relationship (in the depth direction) of the two information terminals 1, the operator may perform an operation of bringing the front surface of one of the two information terminals 1 into contact with the back surface of the other information terminal 1.

Figure 13:
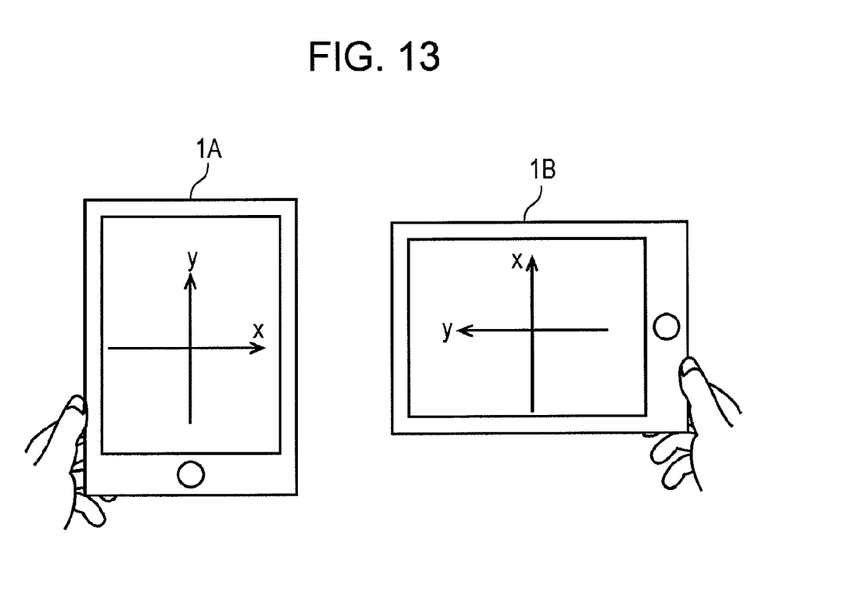
FIG. 13 is a diagram illustrating another example of information terminals that are brought into contact with each other.

An angle formed by individual information terminals 1 may be detected by using the motions of the individual information terminals 1. FIG. 13 is a diagram illustrating another example of information terminals 1 that are brought into contact with each other. In the example illustrated in FIG. 13, the relative position detector 45 detects, on the basis of a sequence of values of acceleration of the information terminal 1B, that the information terminal 1A is on the positive side of the y axis of the information terminal 1B in a contact operation. Then, the relative position detector 45 detects the relative angle between the information terminals 1A and 1B on the basis of the direction of the other information terminal 1 with respect to each of the information terminals 1A and 1B.

The detection of a relative angle may be not performed along the x-axis direction, y-axis direction, and z-axis direction. For example, if the transmitter 33 of the information terminal 1 or the motion obtaining unit 42 extracts the direction of acceleration caused by a contact operation of information terminals 1 by using a method of coordinate transformation or the like from a sequence of values of the sensor 15, a relative angle in a direction other than the above-described directions may be detected.

Also in a case where three or more information terminals 1 are brought into contact with one another, the relative position detector 45 detects the relative positions thereof. Here, it is assumed that the orientations of the individual information terminals 1 are known in advance. The relative position detector 45 detects the direction and magnitude of acceleration (change in motion) in a contact operation of the individual information terminals 1, and detects the relative positions of the individual information terminals 1 on the basis of the detected direction and magnitude. First, the relative position detector 45 detects the direction of acceleration in a contact operation for each of the information terminals 1. If necessary, the relative position detector 45 changes the direction acceleration in accordance with the orientation of each information terminal 1. Subsequently, the relative position detector 45 detects the positional relationship of the two information terminals 1 having the largest magnitude of acceleration and opposite acceleration directions. After that, the relative position detector 45 repeats an operation of placing the information terminal 1 having the second largest magnitude of acceleration on the outer side of the information terminal 1 in which the same direction of acceleration has been detected.

As illustrated in FIG. 12, the magnitude of acceleration detected between the information terminals 1C and 1A, which are directly brought into contact with each other by an operation performed by the operator, is the largest. The magnitude of acceleration in the contact operation in the information terminal 1B, to which acceleration of the contact operation is indirectly transmitted via the information terminal 1A, is smaller. The magnitude of acceleration decreases with distance from the information terminal 1 with which another information terminal 1 is brought into contact. The relative position detector 45 detects the positional relationship of the three or more information terminals 1 by using this theory. Alternatively, the relative position detector 45 may obtain the positional relationship of the three or more information terminals 1 by using a time difference in contact, instead of the magnitude of acceleration. This is because, as is understood from FIG. 12, the time of contact is later with distance from the information terminal 1 with which another information terminal 1 is directly brought into contact.

Of course, in order to detect the relative positions of three or more information terminals 1, an operator may perform an operation of causing the position detecting device 2 to detect the relative positions of two information terminals 1 and an operation of causing the position detecting device 2 to detect the relative positions of one of the information terminals 1 and the other information terminal 1. For example, the operator may cause the position detecting device 2 to detect the relative positions of the information terminals 1A and 1B, and then bring the information terminals 1A and 1C into contact with each other so that the information terminals 1A and 1B are not brought into contact with each other. In this case, detection is performed by using a method for detecting relative positions between two information terminals 1. In a case where the information terminal 1A is brought into contact with the information terminal 1B when the information terminal 1C is brought into contact with the information terminal 1A, the relative positions of the information terminals 1A, 1B, and 1C may be detected in view of information about already detected relative positions.

The display controller 46 is mainly realized by the central controller 21, the memory 22, and the communication unit 23. The display controller 46 performs control so as to cause plural displays included in plural information terminals 1 to display images in accordance with the detected relative positions output from the relative position detector 45. More specifically, in step S157, the display controller 46 transmits, to the individual information terminals 1, information indicating the areas of the entire image to be displayed by the respective information terminals 1, on the basis of the detected relative positions. The individual information terminals 1 display an image associated with the relative position on the display on the basis of the information. For example, a left portion of a large document image may be displayed on the display screen of the information terminal 1A, and a right portion thereof may be displayed on the display screen of the information terminal 1B. In this case, a larger amount of information is organically combined and is displayed than in a case where a single information terminal 1 is used. At this time, the display controller 46 may control display on the basis of not only the relative positions but also the screen sizes of the individual information terminals 1. For example, in the case of displaying an image by arranging information terminals 1 having different screen sizes side by side, such as a smart phone and a tablet terminal, the display controller 46 may perform control so that the size of the image displayed on each information terminal 1 is the same. Also, the display controller 46 may control display so that, when the screen of one of plural information terminals 1, the relative positions of which have been detected, is scrolled, the screen(s) of the other information terminal(s) is (are) also scrolled.

In addition, the display controller 46 may control display orientations in the plural information terminals 1. The orientation of an information terminal 1 is specified on the basis of the orientation of another information terminal 1, which is specified using a certain method, on the basis of a relative angle between the detected information terminals 1. The display controller 46 may control display orientations in the plural information terminals 1 by using the specified orientation. The display orientation in each information terminal 1 may be specified on the basis of an assumption that, for example, the direction in which an information terminal 1 is brought into contact with another information terminal 1 is always the horizontal direction. Even if each information terminal 1 has a function of determining its orientation, portrait or landscape orientation, by using acceleration of gravity, each information terminal 1 that is disposed on a horizontal plane may not be able to determine the display orientation. Even in such a case, a display orientation is specified and controlled on the basis of a detected relative angle. For example, referring to FIG. 7, in the case of moving the information terminals 1A and 1B placed on a horizontal plane so as to bring the information terminals 1A and 1B into contact with each other in a state where display in portrait orientation is performed in the information terminal 1A and display in landscape orientation is performed in the information terminal 1B, the display controller 46 performs control so that display in the same orientation is performed in the information terminals 1A and 1B.

Figure 14:
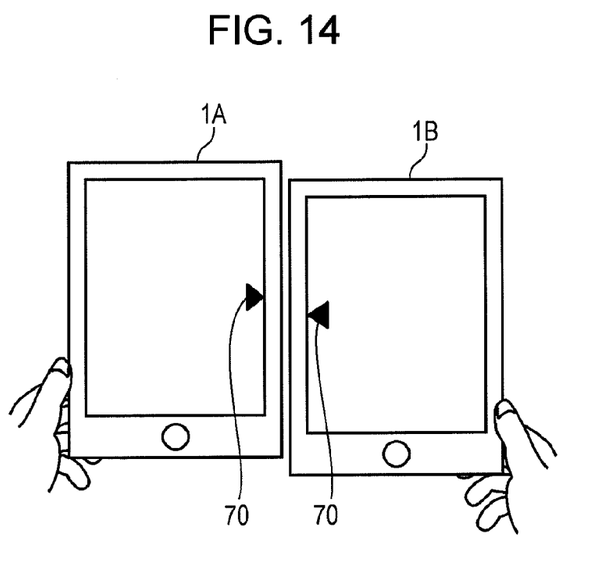
FIG. 14 is a diagram illustrating an example of images for alignment displayed on information terminals.

Furthermore, the display controller 46 may perform control so as to cause each of the plural displays to output an image used as a reference for alignment. FIG. 14 is a diagram illustrating an example of images used for alignment displayed on the information terminals 1. In the example illustrated in FIG. 14, a marker 70 used for alignment is displayed at an edge on the side of the other information terminal 1, on the screen of each information terminal 1. If the information terminals 1 are misaligned when being brought into contact with each other, the operator may perform alignment by using the markers 70.

Figure 15:
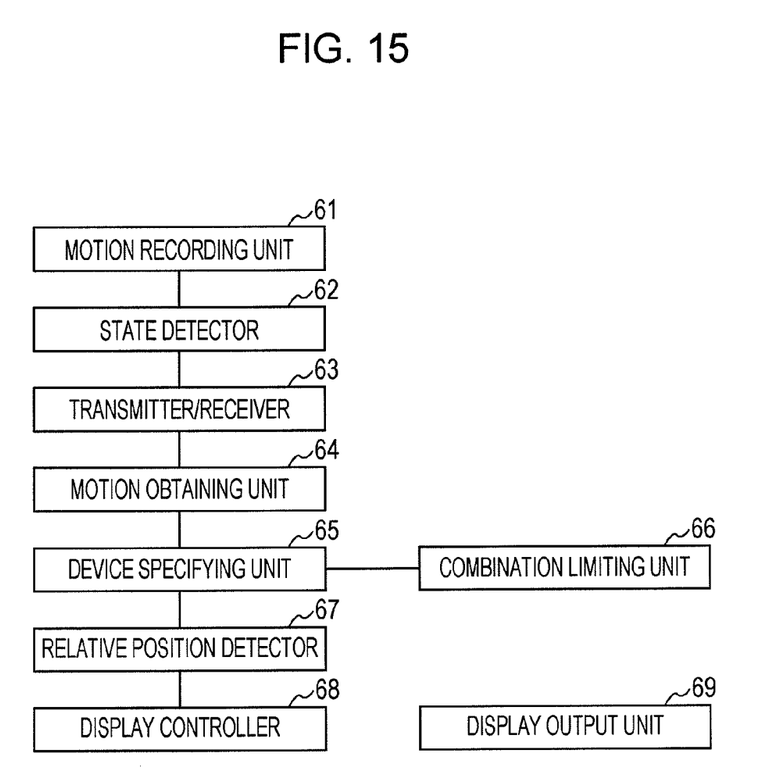
FIG. 15 is a functional block diagram illustrating an example of the configuration of an information terminal including a position detecting device.

Alternatively, the position detecting device 2 may be included in the casing of each information terminal 1. FIG. 15 is a functional block diagram illustrating an example of the configuration of an information terminal 1 that includes the position detecting device 2. The information terminal 1 illustrated in FIG. 15 functionally includes a motion recording unit 61, a state detector 62, a transmitter/receiver 63, a motion obtaining unit 64, a device specifying unit 65, a combination limiting unit 66, a relative position detector 67, a display controller 68, and a display output unit 69. The motion recording unit 61, the state detector 62, the motion obtaining unit 64, the device specifying unit 65, the combination limiting unit 66, the relative position detector 67, the display controller 68, and the display output unit 69 perform a process similar to the process performed by the motion recording unit 31, the state detector 32, the motion obtaining unit 42, the device specifying unit 43, the combination limiting unit 44, the relative position detector 45, the display controller 46, and the display output unit 34, respectively.

The transmitter/receiver 63 is mainly realized by the central controller 11, the memory 12, and the communication unit 13. The transmitter/receiver 63 transmits, to another information terminal 1, values of the sensor 15 in a determination period in which a condition of transmission has been detected by the state detector 62, and receives, from the other information terminal 1, values of the sensor 15 of the information terminal 1. The individual information terminals 1 detect relative positions on the basis of the received information. The transmitter/receiver 63 may determine a control terminal that detects relative positions among the plural information terminals 1, the information terminals 1 other than the center terminal may transmit the values of the sensor 15 to the control terminal, and the display output unit 69 may display an image on the basis of control performed by the control terminal.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A position detecting device comprising:
    a device specifying unit that specifies a plurality of information processing devices that have been brought into contact with one another;
    a motion obtaining unit that obtains information about a motion of any one of the plurality of information processing devices; and
    a relative position detecting unit that detects, on the basis of a motion produced when the any one of the plurality of information processing devices specified by the device specifying unit is brought into contact with another of the plurality of information processing devices, relative positions of the plurality of information processing devices specified by the device specifying unit.

2. The position detecting device according to claim 1, wherein the motion obtaining unit obtains information about a motion of each of the plurality of information processing devices, and
    wherein the relative position detecting unit detects, on the basis of motions produced when the plurality of information processing devices specified by the device specifying unit are brought into contact with one another, relative positions and angles of the plurality of information processing devices specified by the device specifying unit.

3. The position detecting device according to claim 1, wherein the device specifying unit specifies at least three information processing devices that have been brought into contact with one another, and
    wherein the relative position detecting unit detects, on the basis of directions and magnitudes of changes in motions of the at least three information processing devices, relative positions of the at least three information processing devices.

4. The position detecting device according to claim 1, wherein the device specifying unit specifies at least three information processing devices that have been brought into contact with one another, and
    wherein the relative position detecting unit detects, on the basis of directions of changes in motions of the at least three information processing devices and differences in times when the at least three information processing devices are brought into contact with one another, relative positions of the at least three information processing devices.

5. The position detecting device according to claim 1, wherein the device specifying unit specifies, on the basis of an output of a sensor that detects motions of the plurality of information processing devices, the plurality of information processing devices that have been brought into contact with one another.

6. The position detecting device according to claim 5, wherein the device specifying unit specifies, on the basis of the output of the sensor that detects motions of the plurality of information processing devices and information for limiting combinations of the plurality of information processing devices, the plurality of information processing devices that have been brought into contact with one another.

7. The position detecting device according to claim 1, further comprising:
    a display controller that performs, on the basis of the relative positions output from the relative position detecting unit, control so as to cause a plurality of displays included in the plurality of information processing devices specified by the device specifying unit to display an image in accordance with the relative positions.

8. The position detecting device according to claim 7, wherein the display controller performs control so as to cause each of the plurality of displays to output an image serving as a reference of alignment.

9. An information processing device comprising:
    a state detecting unit that detects, on the basis of an output of a sensor that detects a motion, a state of having been brought into contact with another information processing device; and
    a transmitting unit that transmits, in a case where the state of having been brought into contact with another information processing device has been detected, information indicating a motion produced when being brought into contact to a position detecting device that detects a relative position with respect to the other information processing device.

10. The information processing device according to claim 9, wherein the transmitting unit transmits the information to the position detecting device when a state of having been brought into contact with another information processing device two or more consecutive times is detected.

11. A position detection method comprising:
    specifying a plurality of information processing devices that have been brought into contact with one another;
    obtaining information about a motion of any one of the plurality of information processing devices; and
    detecting, on the basis of change of a motion produced when the any one of the plurality of information processing devices is brought into contact with another of the plurality of information processing devices, relative positions of the plurality of information processing devices.

12. An information processing method comprising:
detecting, on the basis of an output of a sensor that detects a motion, a state of having been brought into contact with another information processing device; and
transmitting, in a case where the state of having been brought into contact with another information processing device has been detected, information indicating change of a motion produced when being brought into contact to a position detecting device that detects a relative position with respect to the other information processing device.

13. A non-transitory computer readable medium storing a program causing a computer to execute a process, the process comprising:
specifying a plurality of information processing devices that have been brought into contact with one another;
obtaining information about a motion of any one of the plurality of information processing devices; and
detecting, on the basis of change of a motion produced when the any one of the plurality of information processing devices is brought into contact with another of the plurality of information processing devices, relative positions of the plurality of information processing devices.

14. A non-transitory computer readable medium storing a program causing a computer to execute a process, the process comprising:
detecting, on the basis of an output of a sensor that detects a motion, a state of having been brought into contact with another information processing device; and
transmitting, in a case where the state of having been brought into contact with another information processing device has been detected, information indicating change of a motion produced when being brought into contact to a position detecting device that detects a relative position with respect to the other information processing device.

* * * * *